United States Patent [19]
Spector

[11] Patent Number: 5,820,760
[45] Date of Patent: Oct. 13, 1998

[54] PROCESS FOR REDUCING NITROUS OXIDE EMISSION FROM WASTE WATER TREATMENT

[75] Inventor: Marshall L. Spector, Emmaus, Pa.

[73] Assignee: Competitive Technologies of PA, Inc., Bethlehem, Pa.

[21] Appl. No.: 884,722

[22] Filed: Jun. 30, 1997

[51] Int. Cl.$^6$ ....................................................... C02F 3/26
[52] U.S. Cl. .......................... 210/610; 210/626; 210/627; 210/903
[58] Field of Search ..................................... 210/603, 610, 210/611, 623, 624, 626, 630, 631, 903, 627

[56] References Cited

U.S. PATENT DOCUMENTS

| | | | |
|---|---|---|---|
| 4,056,465 | 11/1977 | Spector | 210/7 |
| 4,552,663 | 11/1985 | Spector et al. | 210/623 |
| 5,182,021 | 1/1993 | Spector | 210/605 |
| 5,213,681 | 5/1993 | Kos | 210/610 |
| 5,520,812 | 5/1996 | Ryhiner et al. | 210/903 |
| 5,650,069 | 7/1997 | Hong et al. | 210/624 |

*Primary Examiner*—Thomas G. Wyse
*Attorney, Agent, or Firm*—Michael R. Novack

[57] ABSTRACT

An activated sludge process for reducing the amount of $N_2O$ released to the atmosphere during biological oxidation of $NH_3$, includes the following steps: mixing wastewater influent containing $NH_3$ and BOD with activated sludge to provide a mixed liquor in a first enclosed aerobic treatment zone wherein an oxygen containing gas is introduced, the first enclosed aerobic treatment zone having two or more stages in which gas and liquor phases are staged and oxygen is transferred to the liquid phase and BOD is metabolized and $NH_3$ is oxidized to NOx and $N_2O$, wherein the $pN_2O$ is maintained at a level greater than 2 mm Hg; transferring the mixed liquor and gas to a second enclosed treatment zone having two or more stages, in which gas and liquid phases are staged, and wherein NOx and $N_2O$ are reduced to $N_2$ and an effluent gas is released to the atmosphere; transferring the mixed liquor to a settling zone wherein the activated sludge is separated from the mixed liquor to form a dense sludge and a clear supernatant; and returning at least a portion of the dense sludge to the enclosed aerobic treatment zone.

15 Claims, 3 Drawing Sheets

FIG. I

PROCESS FOR REDUCING NITROUS OXIDE EMISSION FROM WASTE WATER TREATMENT

This invention was made with U.S. Government support awarded by the Environmental Protection Agency, Grant. No. R189325-01-4. The U.S. Government has certain rights in this invention.

BACKGROUND OF THE INVENTION

The eutrophication of lakes, rivers and other water resources is receiving worldwide attention. Nitrogen compounds are among the causes of eutrophication in that they promote unwanted growth of algae and other aquatic plants. Soluble nitrogen compounds such as ammonia, nitrite and nitrate are removed from wastewater by biological treatment in activated sludge systems. In such systems, removal is conventionally done first by oxidizing ammonia to nitrite, nitrate and nitrous oxide and then reducing nitrite and nitrate (NOx) to nitrous oxide($N_2O$) and elemental nitrogen ($N_2$). Nitrous oxide is a gas which is doubly harmful to the environment.

Nitrous oxide is a greenhouse gas which promotes global warming. It is currently present in the atmosphere at a concentration of about 0.31 ppmv and, with respect to global warming, is equivalent to 98 ppmv of $CO_2$. Nitrous oxide also contributes to destruction of ozone. It is decomposed by intense radiation in the stratosphere to nitric oxide, which catalyzes decomposition of the stratospheric ozone layer. The annual emission of $N_2O$—N from wastewater treatment worldwide has been estimated at one million metric tons per year. This is equivalent to 10% of the $N_2O$—N annually decomposed in the stratosphere. Accordingly, there is a need for a process which efficiently reduces $N_2O$ emission from biological wastewater treatment.

SUMMARY OF THE INVENTION

Reaction of NOx with sewage-sourced biological oxygen demand (BOD) and/or added sources of BOD such as methanol or acetate yields $N_2O$ and $N_2$. Nitrous oxide is the initial reaction product, which can subsequently be reduced to $N_2$. However, $N_2O$ is volatile and virtually all the $N_2O$ released from activated sludge during reaction in open reactors is discharged to the atmosphere.

Not all $N_2O$ is released from activated sludge to the aqueous phase; some is reduced to elemental nitrogen ($N_2$) within cell walls. The portion of $N_2O$ released from sludge can be determined by transferring activated sludge from a given application to a closed reactor and measuring the $N_2O$ accumulated as a function of time. Nitrous oxide accumulates when NOx is being reduced and then declines as the activated sludge catalyzes the reduction of $N_2O$ to $N_2$.

The present invention provides for retention of $N_2O$ in a closed reactor, in which both gas and liquid flows are staged. Nitrous oxide is accumulated in the gas and mixed liquor of the early stages and is decomposed in the mixed liquor of the later stages. Henry's constant for the solubility of $N_2O$ in water 25° C. is 0.0257. This is equivalent to a concentration of 720 mg of $N_2O$—N per liter of water at 760 mm $pN_2O$.

Experimentation in closed reactor systems has shown that the rates of $N_2O$ emission and $N_2O$ decomposition are about equivalent and that both rates are linear with respect to time. However, the rates of $N_2O$ decomposition decline substantially when the $pN_2O$ is less than about 5 mm Hg.

An objective of the present invention is to provide an activated sludge based process in which the quantity of nitrous oxide discharge to the atmosphere is substantially reduced. Another objective is to provide a closed biological reactor, in which both gas and liquid flows are concurrently staged. A still further objective is to biologically decompose $N_2O$ in mixed liquor in equilibrium with $pN_2O$ greater than about 2 mm Hg.

DETAILED DESCRIPTION OF THE INVENTION

Figure 1:
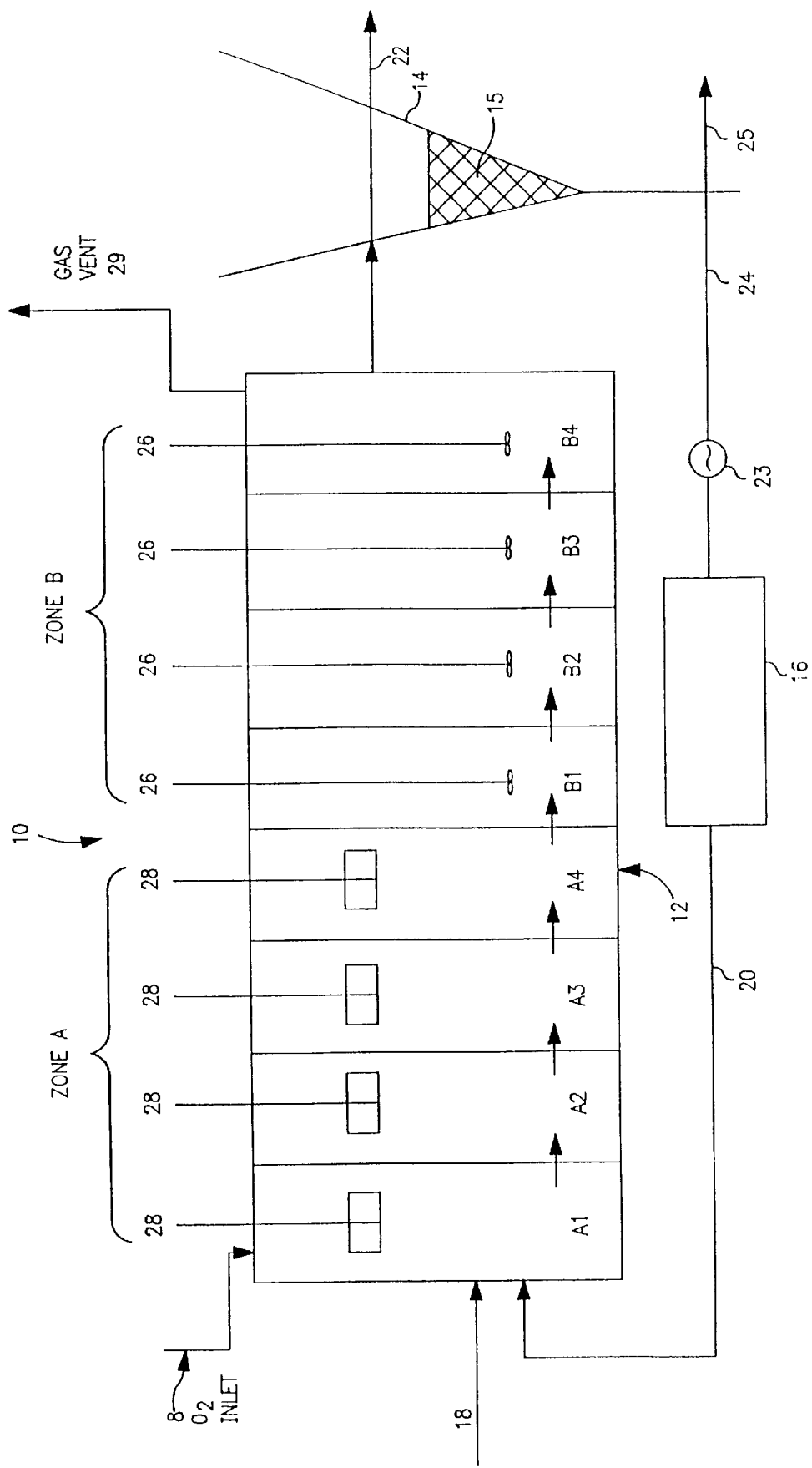
FIG. 1 is a schematic diagram illustrating one embodiment of the invention.

Referring now the drawings, and particularly to FIG. 1, a modified activated sludge wastewater treatment system 10 is shown. The wastewater system includes a secondary treatment reactor 12, a final clarifier 14, and a sludge holding tank 16. The secondary treatment 12 comprises an aerobic first zone A followed by an enclosed zone B. The enclosed aerobic zone A and enclosed zone B are each partitioned into two or more stages in which gas and liquid flows are staged in order to approximate plug flow of both liquid and gas.

It has been found that staging of liquor in zone A is necessary to avoid bypass of NOx and to maximize the $pN_2O$ entering zone B; gas staging also permits maximum utilization of pure oxygen fed at inlet 8. Pure oxygen is preferred in order to reduce the volume of vent gas. Liquid and gas staging are necessary in zone B in order to minimize the $pN_2O$ in the gas discharged to the atmosphere via gas vent 29. In the embodiment shown, the aerobic zone is divided into four distinct stages, A1–A4. This zone is followed by a zone divided into four distinct stages, B1–B4. It should be noted that the dissolved oxygen concentration present in zone B can be in excess of 0.7 ppm.

Wastewater to be treated enters zone A at stage A1 through line 18, where it can be mixed with return activated sludge from the holding tank 16 which enters through line 20. Typically, wastewater is settled sewage from a primary sedimentation tank or clarifier (not shown), but primary sedimentation is not necessary. Influent is stirred and admixed with recycled sludge in A1 to form a mixed liquor. The recycled sludge can be returned from sludge holding tank 16, via line 26. Oxygen is transferred to the mixed liquor via surface aerators 28. Pure oxygen is preferred in order to minimize the volume of gas vented from stage B4 via line 29.

In the aerobic zone A, the mixed liquor is aerated under conditions sufficient to metabolize BOD and to oxidize $NH_3$ present in the wastewater to NOx. The NOx so produced is concurrently reduced by "aerobic denitrifiers", as described in U.S. Pat. No. 5,182,021, incorporated herein by reference. The initial product of NOx reduction is $N_2O$, which progressively accumulates in the gas and liquor of stages A1–A4.

After aeration, both gas and mixed liquor pass to stages B1–B4, each of which are equipped with stirrers 26. Nitrous oxide is reduced to $N_2$ by mixed liquor suspended solids (MLSS) as the liquor and gas in equilibrium with the liquor pass through stages B1–B4.

The mixed liquor passes from zone B to a clarifier 14. The sludge in the mixed liquor settles to the bottom of the clarifier 14 thereby forming a clear supernatant in the top of the clarifier 14 and a dense sludge layer 15 in the bottom. The supernatant is discharged either to further treatment or directly to receiving waters through line 22. Activated sludge concentrated in sludge layer 15 on the bottom of clarifier 14 is transferred to a sludge holding tank 16 via pump 23 through line 24 where the sludge is held in the substantial absence of added oxygen for a prolonged period, i.e. from approximately 4 hours to 20 hours after complete denitrification of sludge 15. As described in U.S. Pat. No. 5,182,021 (incorporated herein by reference), it is the prolonged anaerobic conditioning of sludge that induces "aerobic denitrifiers" to reduce NOx during subsequent aeration in the presence of abundant dissolved oxygen. A portion of sludge is wasted via line 25.

Figure 2:
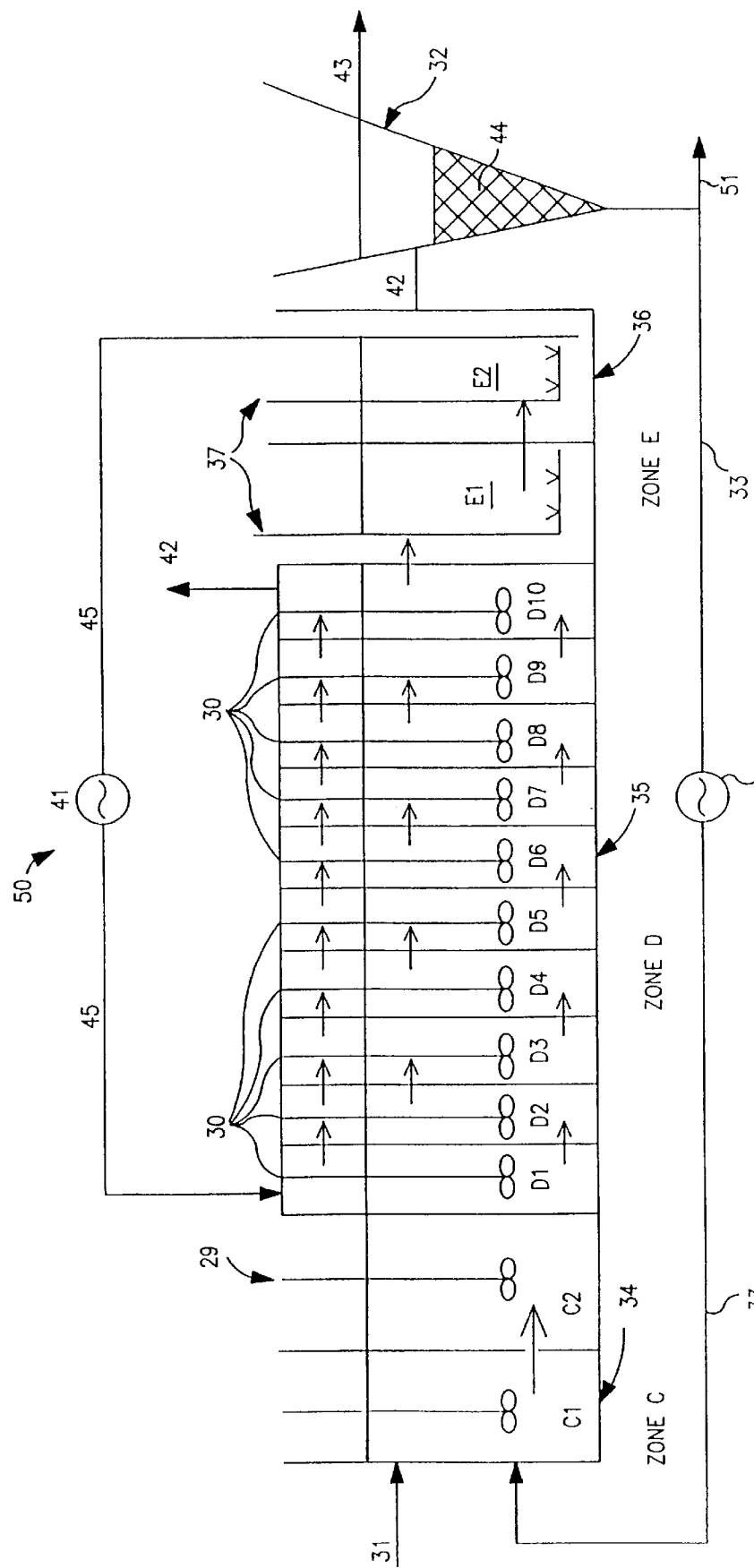
FIG. 2 is a schematic diagram illustrating an alternative embodiment of the invention.

Referring now to FIG. 2 of the drawings, an embodiment of the invention is shown which provides for the removal of $N_2O$ in the denitrification zone, D, of an activated sludge process 50. Three separate treating zones are provided in the illustrated embodiment: an anaerobic zone C, 34, followed by an enclosed zone, D, 35, and an aerobic oxygenated zone E, 36. The BOD-containing wastewater to be treated enters the modified activated sludge system of FIG. 2 by line 31, wherein it is admixed in an initial stage of zone C, 34, with recycled activated sludge returned from the settler or clarifier 32 via line 33 and pump 40.

In zone C, the mixed liquor is stirred by mixers 29 under anaerobic conditions to order to promote proliferation of non-bulking biomass, which also effects biological phosphate removal as described in U.S. Pat. No. 4,056,465, incorporated herein by reference. As illustrated in FIG. 2, approximate plug flow is maintained in zone C by partitioning that vessel for staged liquid flow through two or more hydraulically separate stages.

From zone C, the mixed liquor passes into the closed treating zone D, 35. Both the gas and liquor passing through denitrification reactor, 35, are partitioned into stages D1–D10, which are of equal volume and in which both gas and liquid flow are staged. Each of the stages D1–D10 are equipped with mixers 30. Stage D10 is equipped with a vent 42 to the atmosphere.

From zone D the mixed liquor next flows into and through the aerobic zone E. An oxygen containing gas, which enters via spargers 37 completes oxidation of organic BOD and oxidizes $NH_3$ to $NO_3$. Approximate plug flow is maintained in zone E by providing two or more hydraulically separate stages therein. A portion of the oxidized mixed liquor from stage E2 passes to clarifier 32 thereby forming a clear supernatant in the top of the clarifier and a dense sludge layer 44 in the bottom. The supernatant is discharged either to further treatment or directly to receiving waters through line 43. Activated sludge concentrated in sludge layer 44 is recycled via line 33 and pump 40 to stage C1 of zone C. A portion of activated sludge is wasted via line 51. A portion of mixed liquor is recycled from the last stage in Zone E, E2, to the first stage of Zone D, D1; nitrate is reduced to $N_2O$; and $N_2O$ accumulates in the gas and liquid phases of D1–D5. Accumulated $N_2O$ is reduced to $N_2$ in the mixed liquor in stages D6–D10. One important distinguishing feature of the present invention is the accumulation and destruction of $N_2O$ in zone D.

Figure 3:
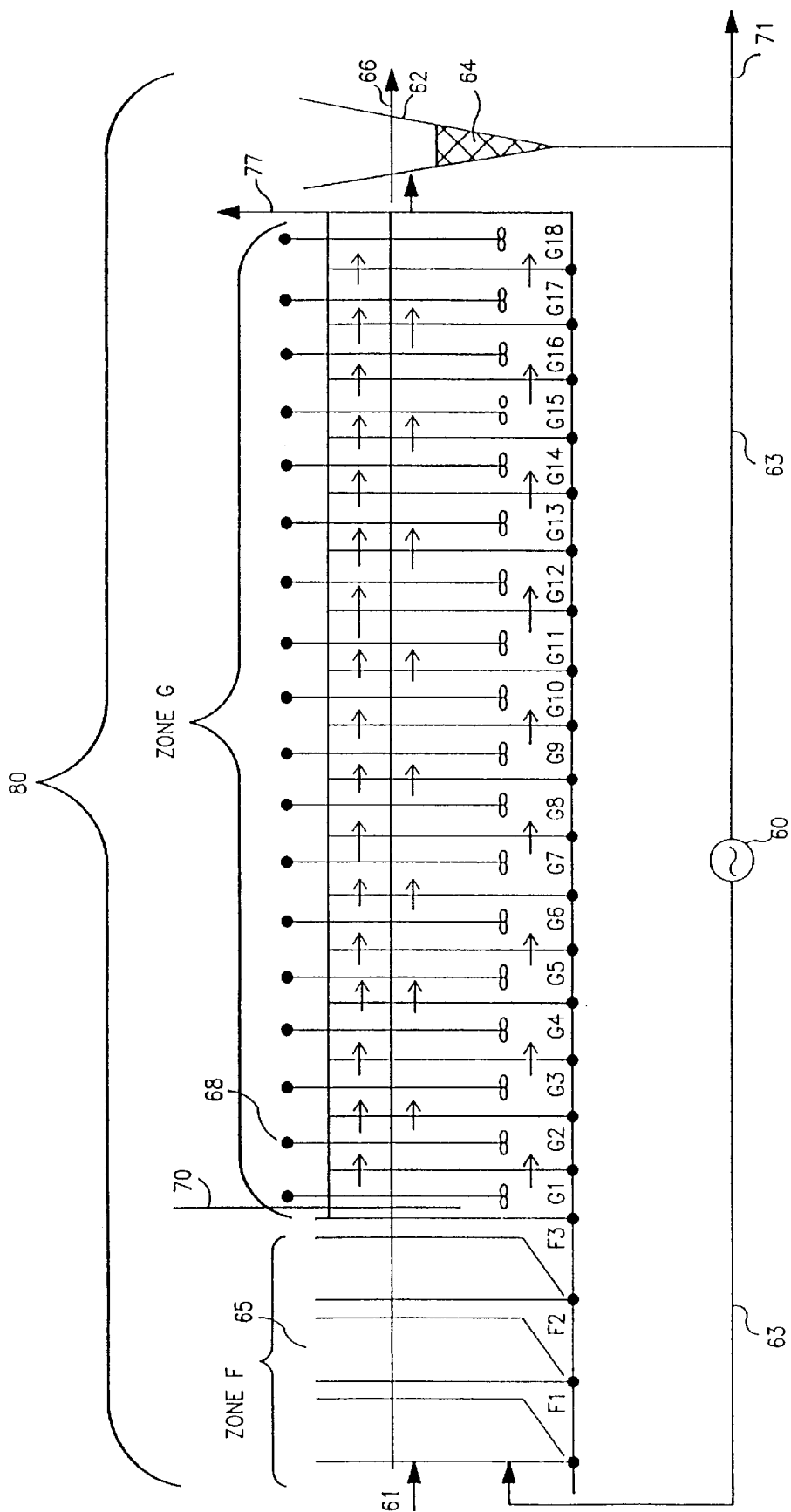
FIG. 3 is a schematic of yet another embodiment of the invention.

In FIG. 3, another embodiment of the present invention is shown which provides for reduction of NOx and removal of $N_2O$. This is accomplished by the provision of an enclosed treatment zone G positioned downstream from aerobic zone F.

Zone G is partitioned into 18 stages, G1–G18, in which gas and liquid flow are staged. Each stage is equipped with a stirrer 68. The mixed liquor entering zone G contains NOx. Facultative organisms in zone G reduce NOx to $N_2O$ and $N_2$ using residual BOD remaining in the biomass and/or wastewater. In the event that BOD from this source is limited, methanol or acetate may be added to the initial stage of zone G, G1, via line 70 in order to increase the rates of NOx reduction, $N_2O$ formation and $N_2O$ decomposition. Zone G also includes gas vent 77. A portion of the mixed liquor passes to clarifier 62 thereby forming a clear supernatant on the top and a dense sludge layer 64 on the bottom. A portion of the sludge 64 is recycled via line 63 and pump 60 to aerobic zone 65 at F1. A portion of the sludge is wasted via line 71. The supernatant is discharged either to further treatment or directly to receiving waters through line 66.

Several examples, using the method of the present invention, are set forth below. These examples are illustrative of the present invention and are not meant to be limiting.

EXAMPLE 1

An activated sludge process is operated as shown in FIG. 1. Zones A and B are of equal volume and each zone is divided into four stages, A1–A4 and B1–B4. The dissolved oxygen concentration in stages A1–A4 is controlled to be greater than about 1 mg $O_2/L$ and to less than about 4 mg $O_2/L$ by controlling the power to the surface aerators. The mixers in stages B1–B4 are operated with the minimum power necessary to keep the MLSS in suspension. Operating data and the concentrations of $NH_3$—N, $NO_3$—N, $NO_2$—N in liquor and $pN_2O$ in the vapor of each of the stages is presented in Table 1.

TABLE 1

| maximum NOx-N converted to $N_2O$—N | 80% |
|---|---|
| MLSS, mg/L | 4400 |
| $dN_2O/dt = -dN_2O/dt$ at $pN_2O > 5$ mm Hg = | 0.022 mg $N_2O$—N/gMLSS/min |
| F(BOD5)/Mass under aeration | 0.3 |
| nominal residence time in zone A + B | 300 min. |

| stage | $NH_3$—N mg/L | $NO_3$—N mg/L | $NO_2$—N mg/L | $pN_2O$ mm Hg | $-dN2O$—N/dt |
|---|---|---|---|---|---|
| A1 | 23 | 0.1 | 0.7 | 1.9 | — |
| A2 | 11 | 0.2 | .4 | 5.7 | — |
| A3 | 7 | 0.3 | .0 | 10.1 | — |
| A4 | 0.2 | 0.5 | 3.0 | 11.9 | 0.022 |
| B1 | 0.1 | 0.1 | 2.6 | 10.8 | 0.022 |
| B2 | 0 | 0.1 | 0.2 | 7.3 | 0.022 |
| B3 | 0 | 0.1 | 0 | 3.4 | 0.005 |
| B4 | 0 | 0.1 | 0 | 1.1 | <0.002 |

It may be seen from $pN_2O$ in Table 1 that about 90% of the $N_2O$ accumulated during aeration in A1–A4 is decomposed during passage through stages B1–B4. It may also be seen that the rate of $N_2O$ decreases when the $pN_2O$ is under 5 mm Hg. While example 1 uses 4 equal size stages in each zone, a greater or lesser number of stages may be employed and the volume of the stages need not all be equivalent.

The vessel where influent and RAS are initially mixed need not be within Zone A. Instead, a separate upstream zone (not shown), maintained under either anaerobic or anoxic conditions, may be used. The mixed liquor flow in such anaerobic or anoxic zone may be partitioned into two or more stages in order to approach plug flow.

EXAMPLE 2

An activated sludge system is operated in accordance with the embodiment of the invention outlined in FIG. 2. The flow of RAS is 20% of the influent flow and the flow of mixed liquor recycled from stage E to cell D1 is 100% of the flow of RAS plus influent. A profile of nitrogen concentration and operating data are presented in Table 2.

TABLE 2

|  | influent | RAS | zone C | | zone D | | zone E | |
| --- | --- | --- | --- | --- | --- | --- | --- | --- |
|  |  |  | in | out | in | out | in | out |
| $NH_3$, mg N/L | 24 | 0 | 20 | 16 | 8 | 8 | 8 | 0 |
| $NO_3$, mg N/L | 0 | 0 | 0 | 0 | 4 | 0 | 0 | 8 |
| maximum $NO_3$—N converted to $N_2O$—N |  |  | 80% | | | | | |
| MLSS, mg/L |  |  | 2200 | | | | | |
| $-dNO_3/dt$ |  |  | 0.24 mg $NO_3$—N/gMLSS/min. | | | | | |
| $dN_2O/dt$ |  |  | 0.19 mg $NO_3$—N/gMLSS/min. | | | | | |
| $-dN_2O/dt$ |  |  | as shown in Table 3 | | | | | |
| F(BOD5)/MLSS under aeration |  |  | 0.3 | | | | | |
| influent detention time, |  |  |  | | | | | |
| stage C |  |  | 24 min | | | | | |
| stage D |  |  | 36 min | | | | | |
| stage E |  |  | 150 min | | | | | |
| nominal residence time, |  |  |  | | | | | |
| stage C |  |  | 20 min | | | | | |
| stage D |  |  | 15 min | | | | | |
| stage E |  |  | 63 min | | | | | |

It may be seen from Table 2 that the concentration of $NO_3$—N entering stage D is less than 4 mg/L and therefore the maximum Concentration of $N_2O$—N at 80% conversion of $NO_3$—N to $N_2O$—N is 3.2 mg/L, which is in equilibrium with a $pN_2O$ of 3.4 mm Hg. The rates of $N_2O$ decomposition are all low because of limitation by $pN_2O < 5$ mm Hg. Concentrations of $NO_3$—N and $N_2O$—N in the liquor and the $pN_2O$ above liquor in stages D1 to D10 are presented in Table 3.

TABLE 3

| stage | $NO_3$—N mg/L | $N_2O$—N mg/L | $PN_2O$ mm Hg | $-dN_2O$—N/dt mgN/gMLSS/min. |
| --- | --- | --- | --- | --- |
| inf. | 4.0 |  |  |  |
| D1 | 3.2 | 0.6 | 0.7 | — |
| D2 | 2.4 | 1.3 | 1.3 | — |
| D3 | 1.6 | 1.9 | 2.0 | — |
| D4 | 0.8 | 2.5 | 2.7 | — |
| D5 | 0 | 3.2 | 3.4 | — |
| D6 | 0 | 2.7 | 2.9 | 0.10 |
| D7 | 0 | 2.4 | 2.5 | 0.08 |
| D8 | 0 | 2.1 | 2.2 | 0.07 |
| D9 | 0 | 1.9 | 2.0 | 0.07 |
| D10 | 0 | 1.6 | 1.7 | 0.06 |

About half the $N_2O$ accumulated in stages D1–D5 is removed within stages D6–D10, prior to venting exit gas to atmosphere via line 77. Eight mg of $NO_3$—N/L are in the effluent discharged from the reactor to the clarifier and then to receiving waters. If desired, the $NO_3$—N concentration can be decreased in a denitrification zone positioned after aeration as shown in FIG. 3 and set forth in Example 3.

EXAMPLE 3

An activated sludge process is operated in accordance with the embodiment outlined in FIG. 3. Zone G is partitioned into 18 stages, G1–G18. The first half of zone G is divided into the eight equal stages, G1–G8, and the last half of zone G is divided into equal stages, G9–G18. The RAS flow is 20% of the influent. Data presented in Table 4 are obtained in the absence of added reducing agents, such as methanol, acetate or sugar. It should be noted that the concentration of $NO_3$ entering Zone G is reduced during passage through the initial stages of zone G.

TABLE 4

|  | influent | RAS | zone F | | zone G | |
| --- | --- | --- | --- | --- | --- | --- |
|  |  |  | in | out | in | out |
| $NH_3$, mg N/L | 24 | 0 | 0 | 0 | 0 | 0 |
| $NO_2$, mg N/L | 0 | 0 | 0 | 16 | 16 | <1 |
| maximum $NO_3$—N converted to $N_2O$—N |  |  | 50% | | | |
| $-dNO_3/dt$ |  |  | 0.006 mgN/gMLSS/L | | | |
| $dN_2O/dt$ |  |  | 0.003 mgN/gMLSS/L | | | |
| $-dN_2O/dt$ at p $N_2O > 5$ mm |  |  | 0.003 mgN/gMLSS/L | | | |
| MLSS, rng/L |  |  | 2500 | | | |
| residence time, |  |  |  | | | |
| Zone F |  |  | 18 hours | | | |
| Zone G |  |  | 18 hours | | | |

The concentration of $NO_3$ in the mixed liquor of stages G1–G7 and $pN_2O$ in the gas above each stage is shown in Table 5.

TABLE 5

| stage | $NO_3$, mg N/L | $pN_2O$, mm Hg |
| --- | --- | --- |
| inf. | 16 |  |
| G1 | 14 | 1.1 |
| G2 | 12 | 2.1 |
| G3 | 10 | 3.2 |
| G4 | 8 | 4.2 |
| G5 | 6 | 5.3 |
| G6 | 4 | 6.3 |
| G7 | 2 | 7.4 |
| G8 | — | 8.4 |
| G9 | — | 7.6 |
| G10 | — | 7.0 |
| G11 | — | 6.3 |
| G12 | — | 5.5 |
| G13 | — | 4.9 |
| G14 | — | 4.2 |
| G15 | — | 3.6 |
| G16 | — | 3.1 |
| G17 | — | 2.7 |
| G18 | — | 2.4 |

About 70% of the $N_2O$ accumulated in stages G1–G8 is decomposed prior to venting exit gas to the atmosphere via line 77. The nominal residence time in zones F and G is 36 hours. This time can be shortened by the addition of BOD to zone G as shown in Example 4.

EXAMPLE 4

Example 3 is repeated with the exception that methanol is added as a source of BOD to stage G1 of FIG. 3. Methanol is added at a weight ratio of 1.9 parts per part of $NO_3$—N entering zone G; this ratio is stoichiometric for the reduction of $NO_3$ to $N_2$. The activated sludge requires several weeks to acclimate to methanol, but after acclimatization the rates of $NO_3$ reduction, $N_2O$ emission and $N_2O$ decomposition increase about six fold. The data in tables 4 and 5 remain essentially unchanged with the exception of the increase in reaction rates and consequent reduction of nominal residence time in zones F and G from 18 to 3 hours. The process and reactor of the present invention significantly reduces the amount of $N_2O$ discharged to the atmosphere from activated sludge systems, which remove $NH_3$ and NOx from wastewater.

What is claimed is:

1. An activated sludge process for reducing the amount of $N_2O$ released to the atmosphere during biological oxidation of $NH_3$, comprising the steps of:

mixing wastewater influent containing $NH_3$ and BOD with activated sludge to provide a mixed liquor in a first enclosed aerobic treatment zone wherein an oxygen containing gas is introduced, said first enclosed aerobic treatment zone having two or more stages in which gas and liquor phases are staged and oxygen is transferred to the liquid phase and BOD is metabolized and $NH_3$ is oxidized to NOx and $N_2O$, wherein the $pN_2O$ is maintained at a level greater than 2 mm Hg;

transferring the mixed liquor and gas to a second enclosed treatment zone having two or more stages, in which gas and liquid phases are staged, and wherein NOx and $N_2O$ are reduced to $N_2$ and an effluent gas is released to the atmosphere;

transferring the mixed liquor to a settling zone wherein the activated sludge is separated from the mixed liquor to form a dense sludge and a clear supernatant; and returning at least a portion of the dense sludge to the enclosed aerobic treatment zone.

2. The process as defined in claim 1 wherein the concentration of the oxygen in the gas introduced into the first enclosed aerobic treatment zone is greater than the concentration of oxygen in the ambient air.

3. The process as defined in claim 1 further comprising the step of discharging the clear supernatant formed in the settling zone to receiving waters.

4. The process as defined in claim 1 wherein a portion of the dense sludge formed in the settling zone is transferred to a sludge holding zone maintained under anaerobic conditions before being returned to the aerobic treatment zone.

5. An activated sludge process for reducing the amount of $N_2O$ released to the atmosphere during biological reduction of $NO_3$, comprising the steps of:

mixing wastewater influent containing $NH_3$ and BOD with activated sludge to provide a mixed liquor in an anaerobic treatment zone;

transferring the mixed liquor to an enclosed treatment zone containing a gas wherein nitrate is obtained by internal transfer of mixed liquor, said enclosed treatment zone having two or more stages, wherein gas and liquid phases are staged and nitrate is reduced to $N_2O$, wherein the $N_2O$ accumulates and is subsequently reduced to $N_2$ and an effluent gas is released to the atmosphere;

transferring the mixed liquor to an aerated treatment zone in which $NH_3$ is oxidized to $NO_3$ and BOD is metabolized;

returning a first portion of the mixed liquor from the aerated treatment zone to the enclosed treatment zone;

transferring a second portion of the mixed liquor from the aerated treatment zone to a settling zone wherein the activated sludge is separated from the mixed liquor to form a dense sludge and a clear supernatant; and returning at least a portion of the dense sludge from the settling zone to the anaerobic treatment zone.

6. The process as defined in claim 5 further comprising the step of discharging the clear supernatant formed in the settling zone to receiving waters.

7. An activated sludge process for reducing the amount of $N_2O$ released to the atmosphere during biological reduction of NOx, comprising the steps of:

mixing wastewater influent containing BOD and $NH_3$ with activated sludge to provide a mixed liquor in an aerobic treatment zone, wherein the BOD is metabolized and the $NH_3$ is oxidized to NOx;

transferring the mixed liquor to an enclosed treatment zone containing a gas and having two or more stages in which gas and liquid phases are staged and NOx is reduced to $N_2O$ and/or $N_2$, and $N_2O$ is subsequently reduced to $N_2$ and an effluent gas is released to the atmosphere;

transferring the mixed liquor to a settling zone wherein the activated sludge is separated from the mixed liquor to form a dense sludge and a clear supernatant; and returning a portion of the dense sludge to the aerobic treatment zone.

8. The process as defined in claim 7 wherein methanol or acetate is added to the enclosed treatment zone.

9. The process as defined in claim 7 further comprising the step of discharging at least a portion of the clear supernatant formed in the settling zone to receiving waters.

10. An activated sludge process for reducing the amount of $N_2O$ released to the atmosphere during biological oxidation of $NH_3$, comprising the steps of:

mixing wastewater influent containing $NH_3$ and BOD with activated sludge to provide a mixed liquor in a first enclosed aerobic treatment zone having two or more stages in which BOD is metabolized and $NH_3$ is oxidized to NOx and $N_2O$;

transferring the mixed liquor to a second enclosed treatment zone having two or more stages wherein the $N_2O$ is reduced to $N_2$;

transferring the mixed liquor to a settling zone wherein the activated sludge is separated from the mixed liquor to form a dense sludge and a clear supernatant; and returning a portion of the activated sludge to the enclosed treatment zone.

11. The process as defined in claim 10 wherein a portion of the dense sludge formed in the settling zone is transferred to a sludge holding zone maintained under anaerobic conditions before being returned to the aerobic treatment zone.

12. An activated sludge process for reducing the amount of $N_2O$ released to the atmosphere during the reduction of $NO_3$, comprising the steps of:

mixing wastewater influent containing $NH_3$ and BOD with activated sludge to provide a mixed liquor in an anaerobic treatment zone;

transferring the mixed liquor to an enclosed treatment zone wherein nitrate is obtained by internal transfer of mixed liquor from the aerobic treatment zone, said enclosed treatment zone having two or more stages wherein nitrate is reduced to $N_2O$, wherein the $N_2O$ accumulates and is subsequently reduced to $N_2$;

transferring the mixed liquor to an aerobic treatment zone;

returning a first portion of the mixed liquor from the aerobic treatment zone to the enclosed treatment zone;

transferring a second portion of the mixed liquor from the aerobic treatment zone to a settling zone wherein the activated sludge is separated from the mixed liquor to form a dense sludge and a clear supernatant; and returning a portion of the activated sludge from the settling zone to the anaerobic treatment zone.

13. The process as defined in claim 12 further comprising the step of discharging the clear supernatant formed in the settling zone to receiving waters.

14. An activated sludge process for reducing the amount of $N_2O$ released to the atmosphere during biological reduction of NOx, comprising the steps of:

mixing wastewater influent containing BOD and $NH_3$ with activated sludge to provide a mixed liquor in an aerobic treatment zone, wherein the BOD is metabolized and the $NH_3$ is oxidized to NOx;

transferring the mixed liquor to an enclosed treatment zone having two or more stages wherein NOx is reduced to $N_2O$ and/or $N_2$, and $N_2O$ is subsequently reduced to $N_2$;

transferring the mixed liquor to a settling zone wherein the activated sludge is separated from the mixed liquor to form a dense sludge and a clear supernatant; and returning a portion of the activated sludge to the treatment zone maintained under aerobic conditions.

15. The process as defined in claim 14 wherein methanol or acetate is added to the enclosed treatment zone.

* * * * *